Figure 1:
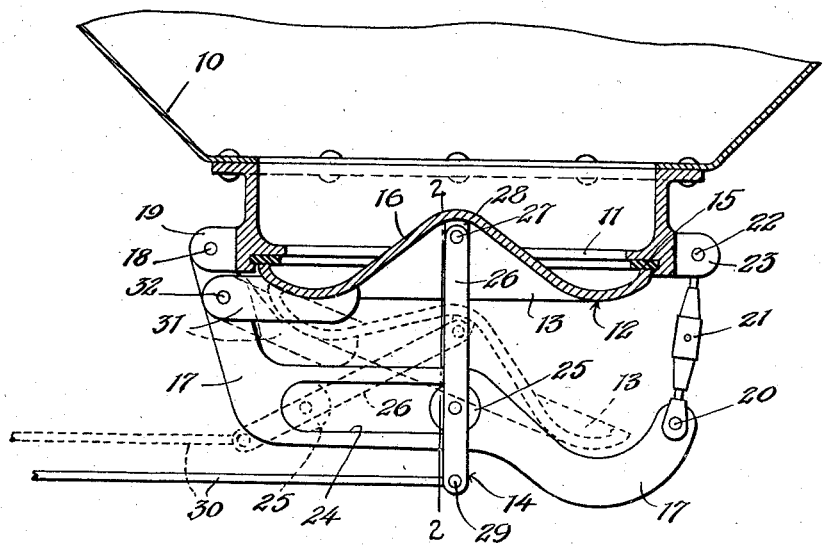

July 29, 1930.  A. G. BUTLER ET AL  1,771,743

EMERGENCY DUMP VALVE

Filed March 8, 1928

INVENTORS
GEORGE A. PAGE & ARTHUR G. BUTLER
BY
ATTORNEY

Patented July 29, 1930

1,771,743

UNITED STATES PATENT OFFICE

ARTHUR G. BUTLER, OF HEMPSTEAD, AND GEORGE A. PAGE, JR., OF FREEPORT, NEW YORK, ASSIGNORS TO CURTISS AEROPLANE & MOTOR COMPANY, INC., A CORPORATION OF NEW YORK

EMERGENCY DUMP VALVE

Application filed March 8, 1928. Serial No. 260,139.

Our invention relates to emergency gate or dump valves for fluid containers.

In aircraft, for instance, it is often desirable to empty, or partially empty, the fuel tank or tanks, if and when a forced landing is or appears to be inevitable. Such forced landing may result from temporary motor failure, because of weather conditions, or from any other cause. To better condition an aeroplane for a safe landing in an emergency, it is at once desirable to lighten the machine as much as possible. It has been the practice heretofore, in this connection, to either shed the fuel tank or tanks clear of the machine or to dump the fuel by opening up either a rip panel or an emergency dump valve formed in the bottom of the tank. By dumping the fuel not only is the machine very substantially lightened, but in addition, the fire hazard in every appreciably reduced.

Where, in an emergency, the fuel tank or tanks are shed clear of the machine, or where the fuel tank or tanks are emptied by opening up a rip panel, or the heretofore used emergency dump valve thereof, continued flight is impossible without re-fueling, without repairing the riped tank or tanks, without installing a new fuel tank, or without closing the emergency dump valve when and after the machine is at rest. A long tiresome and troublesome delay at the emergency landing field, even if the machine is otherwise undamaged, is the result. This is particularly true where the emergency landing field is an isolated one lacking service facilities.

An object of the present invention is to provide an emergency dump valve for fluid containers or fuel tanks in which the pilot or other occupant of the machine can instantaneously open up and instantanenously reclose the dump valve during flight. An emergency dump valve thus characterized is advantageous in that the pilot can, as his better judgment dictates, either dump the entire contents of the fuel tank or tanks or dump only that portion thereof deemed sufficient to cut down the weight of the craft to enhance a reasonably safe forced landing. He can, if the forced landing is on water, and the machine he is piloting is a land plane, dump the entire contents of the tank or tanks and before landing seal the then empty tank or tanks by reclosing the dump valve or valves to thereby add just so much reserve or extra buoyancy to the machine. If the forced landing occurs at a more or less isolated emergency landing field, and the machine is in no way irreparably damaged he can, without service facilities, and when conditions are adjusted for further flight, proceed without delay to the closest flying field, using for such flight the reserve or emergency fuel retained in the fuel tank or tanks by closing the dump valve before the entire contents of the tank or tanks has been emptied. The above and other advantages follow as a result of the installation in aircraft of one or more emergency gate or dump valves of the character herein set forth.

Figure 2:
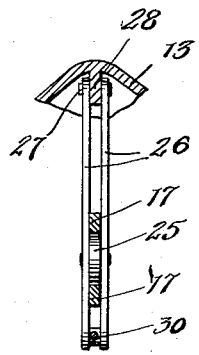

In the drawings, wherein like reference characters denote like or corresponding parts, Fig. 1 is a longitudinal vertical sectional view of the invention, and Fig. 2 is a section on the line 2—2 of Fig. 1.

In the embodiment of the invention selected for illustration, an aircraft fuel tank or container 10 is shown. On its underside said tank 10 has formed therein an opening 11. Over said opening 11 the emergency gate or dump valve 12 is fastened in place. The gate or dump valve 12 preferably comprises a cover plate or closure 13 and suitable valve operating mechanism 14 by means of which it (the cover plate) is moved into and out of firm bearing contact with a suitable gasket 15 encircling the opening in the tank. Said cover plate is centrally depressed as indicated at 16 to provide a substantially cone-shaped projection which, in the closed position of the valve, extends upwardly well into the open mouth of the container. At its base, said cone-shaped projection rounds off radially in an upward direction toward the periphery of said cover plate so that the fluid in following the curvature thereof is discharged therefrom radially and slightly upwardly.

The operating mechanism 14 by means of which the cover plate 13 is moved into and out of engagement with the container 10 comprises an arm 17 pivoted as at 18 between ears 19 formed on the container at one side of its open end. From its pivot 18 said arm 17 extends downwardly to a point well below the bottom end of the container, thence inwardly and across the cover plate at a level substantially below the normal level of said cover plate (when closed) and thence arcuately away from said cover plate to a point 20 where it is pivotally fastened to the outer end of an adjusting link 21. This link 21 (herein shown as an ordinary turnbuckle) is pivotally fastened as at 22, at its inner end, between ears 23 formed on the container at that side of its open end directly opposite to the ears 19. By adjusting said link 21 the angular position of the arm 17 relatively to the open end of the container can be varied. Except for such adjustment the position of the arm 17 remains fixed at all times.

Within said arm 17, throughout that portion of its straight length extending across and below the level of the cover plate 13, a guide slot 24 is formed. At one end said slot 24 is carried to a point just beyond a vertical line passing thru the exact center of the cover plate, whereas at its opposite end it is carried to a point sufficiently removed from said vertical line to admit of the complete opening of said cover plate or valve. Within the slot 24 a roller 25 is adapted to work back and forth in opening and closing the valve. Said roller 25 is carried by an operating lever 26 pivotally fastened at one end as at 27 to a lug 28 formed on the underside of the cover plate 13 at or near the apex of its cone-shaped center portion. The outer or opposite end of said lever 26 has fastened thereto as at 29 a rod 30 adapted to be operated from a point in convenient proximity to the pilot's seat (not shown). By exerting a pull on said rod 30 the lever 26 is guided in its movement by the engagement of the roller within the guide slot 24, and, as said lever is pivoted at its inner end to the cover plate 13, it (the cover plate) is moved out of engagement with its seat and away from the container in direct proportion as said lever 26 is moved by the rod 30 toward the dotted line position thereof indicated in Fig. 1. To reclose the valve, when opened, it is but necessary to push the rod 30 in a reverse direction or until the roller 25 is forced into engagement with the inner end of the guide slot. In thus positioning the roller 25 it is first brought to what may be designated a "dead center position" i. e.. a position directly beneath and in vertical alignment with the center of the cover plate, in which position the cover plate is forced firmly against its seat and the valve completely closed. The slightest movement of the roller 25 beyond said dead center position or into engagement with the inner end of the slot 24, is instrumental in automatically locking or holding the cover plate in its closed position.

It should also be noted that the cover plate 13 is guided in its movement by an arm 31 fastened thereto at one side thereof and loosely pivoted as at 32 to the arm 17. This arm 31 is bifurcated to straddle the arm 17 and its sole function is that of a guide by means of which the cover plate is centered beneath its seat in a valve closing operation. Also, it should be noted that the lever 26 is divided longitudinally (see Fig. 2); that the arm 17 is carried between the divided portions thereof; and that the roller 25 is mounted on trunnions extending, one trunnion thru each divided portion.

As intimated, an emergency dump valve thus characterized is positive in operation, can be instantaneously opened to dump the fluid contents of the container either in whole or in part, can be instantaneously closed to re-seal the container by merely operating the rod 30 from a point in convenient proximity to the pilot's seat, and hence while the machine is in flight, and is so organized and constructed as to make it next to impossible to reseat the cover plate 13 in any manner other than that admitting of a practical seal.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What we claim is:

1. A dump valve for fluid containers including a cover plate for an opening in said container, an arm extending across said opening beneath said cover plate, said arm having formed therein a guide slot, a lever pivoted at one end to said cover plate and extending at its opposite end across said arm, a roller carried by said lever and engaging in said guide slot, said roller being movable lengthwise said slot to open and close said cover plate, and means fastened to said lever for controlling the movement of said roller.

2. A dump valve for fluid containers including a cover plate for an opening in said container, an arm extending across said opening beneath said cover plate, said arm having formed therein a guide slot, a lever pivoted at one end to said cover plate and extending at its opposite end across said arm, a roller carried by said lever and engaging in said guide slot, said slot at one end terminating substantially directly beneath the point of attachment of said lever to said cover plate, and means attached to said lever for controlling the movement of said roller along said slot to open and close said cover plate.

3. A dump valve for fluid containers including a cover plate for an opening in said container, an arm extending across said opening beneath said cover plate, said arm having formed therein a guide slot, a lever pivoted at one end to said cover plate and extending at its opposite end across said arm, a roller carried by said lever and engaging in said guide slot, said roller being movable lengthwise said slot to open and close said cover plate, means carried by said arm and fastened to said cover plate for centering said cover plate over said opening in a closing operation, and means attached to said lever for controlling the movement of said roller.

4. A dump valve for fluid containers including a cover plate for an opening in said container, an arm extending across said opening beneath said cover plate, said arm having formed therein a guide slot, a lever pivoted at one end to said cover plate and extending at its opposite end across said arm, a roller carried by said lever and engaging in said guide slot, said roller being movable lengthwise said slot to open and close said cover plate, means fastened to said lever for controlling the movement of said roller, and means for adjusting said arm in its relation to said container.

In testimony whereof we hereunto affix our signatures.

ARTHUR G. BUTLER.
GEORGE A. PAGE, Jr.